United States Patent
Snyder

[15] 3,662,818
[45] May 16, 1972

[54] VAPOR TRANSFER

[72] Inventor: John Snyder, Lockport, N.Y.

[73] Assignee: General Motors Corporation, Detroit, Mich.

[22] Filed: May 11, 1970

[21] Appl. No.: 36,078

[52] U.S. Cl. .................................. 165/23, 165/42
[51] Int. Cl. ............................................ B60h 3/04
[58] Field of Search ........................... 165/23, 41–44

[56] References Cited

UNITED STATES PATENTS 3,315,730   4/1967   Weaver et al. ......................... 165/23
3,451,468   6/1969   Furrow .................................. 165/23

*Primary Examiner*—Charles Sukalo
*Attorney*—William S. Pettigrew and John C. Evans

[57] ABSTRACT

In preferred form, an automobile heating and air conditioning system having a plenum chamber containing a heater core and an evaporator core, and a closable purge outlet opening into the passenger compartment. When the heating and air conditioning system is inoperative, the purge outlet allows air to flow through the plenum chamber and into the passenger compartment to prevent the formation of odor and humidity in the chamber. When the system is operative to heat, cool or ventilate the automobile interior, the purge outlet is blocked by a pivotal door which also directs air through a heater outlet for distribution into the passenger compartment.

5 Claims, 21 Drawing Figures

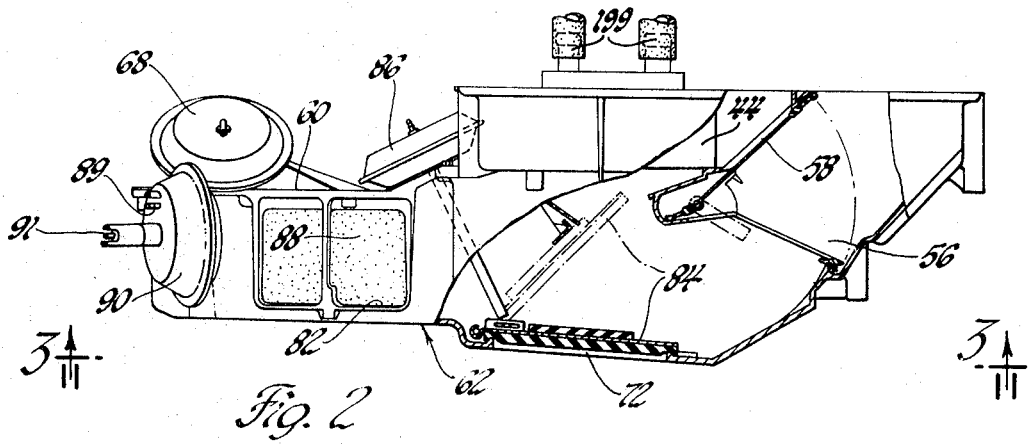
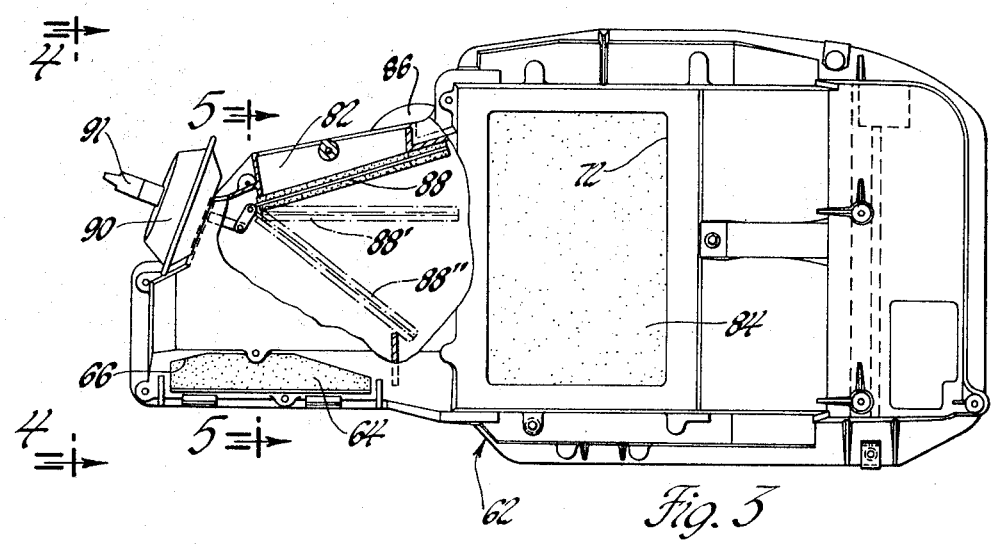
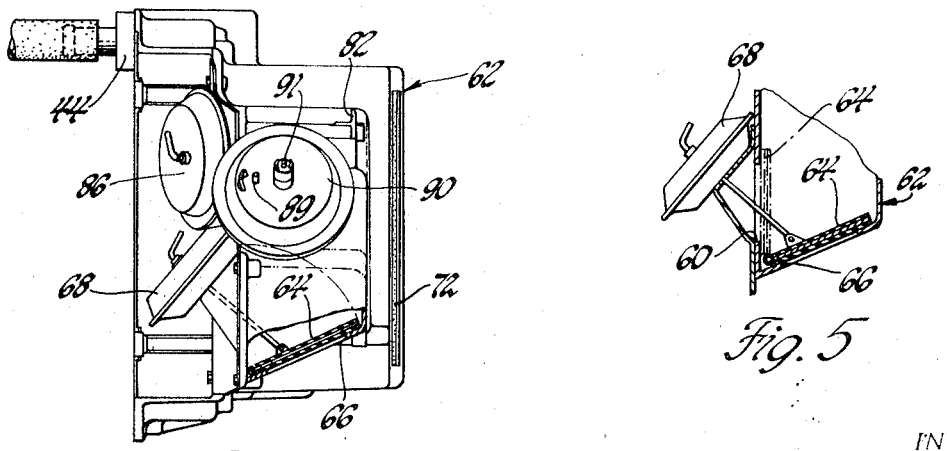
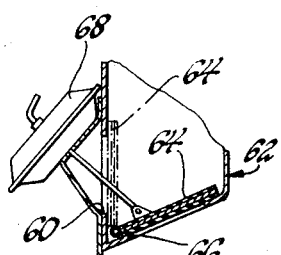

INVENTOR.
John Snyder
BY
J.C. Evans
ATTORNEY

INVENTOR
John Snyder

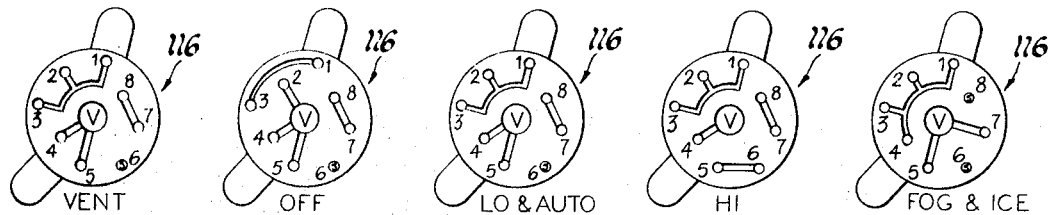
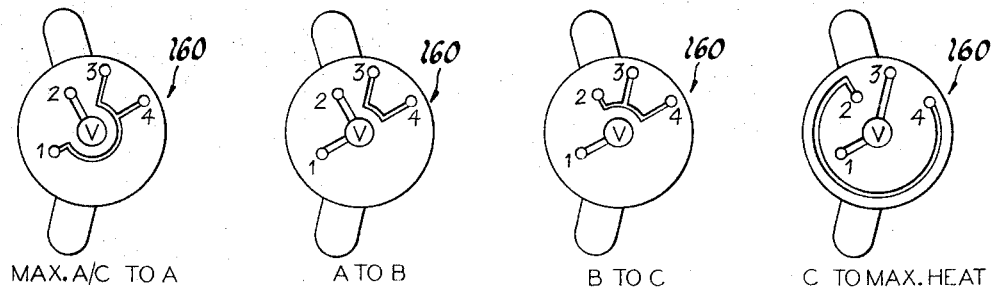
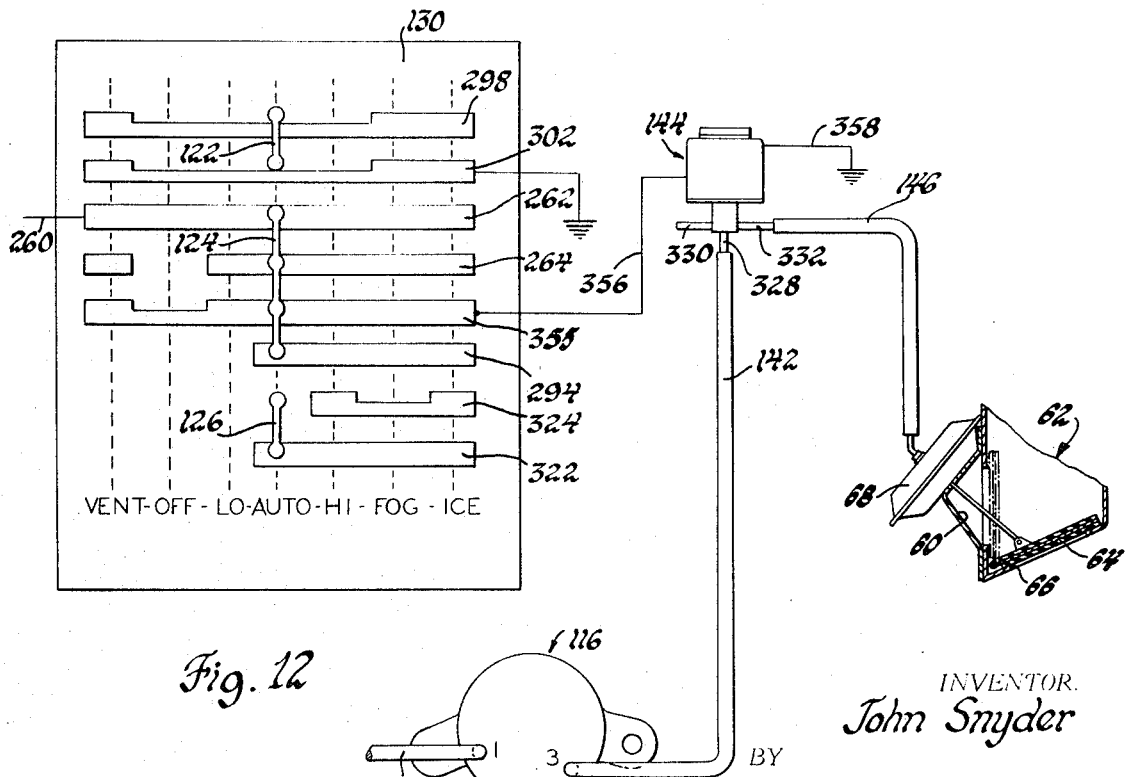
Fig. 12
INVENTOR.
John Snyder
BY
J.C. Evans
ATTORNEY

VAPOR TRANSFER

This invention relates to an automobile heating and air conditioning system and more particularly to such a system having means to prevent the formation of odor and humidity.

When prior automobile heating and air conditioning systems are inoperative, stagnant air surrounds the heater and evaporator cores within a plenum chamber. Odor and humidity may form in the plenum chamber because of this stagnant condition and because of the dehumidification caused by the cool evaporator core of the air conditioning system. When the system is activated, the discharge of this accumulated odor and humid air into the passenger compartment is undesirable.

Another problem with prior automobile heating and air conditioning systems is heat buildup within the plenum chamber during the period the system is inactivated. Because of the plenum chamber's close proximity to the engine compartment, the temperature of air within a closed plenum can increase significantly. The problem is of course more severe during the summer season when an initial blast of hot air into the passenger compartment would be most undesirable. Therefore, it is desirable to prevent the formation of hot air within the plenum chamber prior to activating the air conditioning system.

The subject heating and air conditioning system includes conventional heating and air conditioning components such as a heater core and an evaporator core within a plenum chamber, an inlet for admitting air to the chamber and outlets for passing air back into the passenger compartment. Additionally, the system includes a purge outlet which is open to the passenger compartment when the system is inoperative to maintain a continuous flow of air through the plenum chamber. This air flow prevents the formation of odor, humidity and heat in the plenum chamber. Thereafter, when the system is activated, the purge outlet is closed by a pivotal door which then directs air into the passenger compartment through a heater outlet.

Therefore, an object of the inventor is to provide an automobile heating and air conditioning system with means to automatically prevent the formation of odor, humidity and hot air in a chamber which contains the heater and evaporator cores while the system is inoperative.

A further object of the inventor is to provide an automobile heating and air conditioning system with a purge outlet in duct work which encloses a heater core and an evaporator core and through which a continuous flow of air is maintained while the system is inactive to prevent the formation of odor, humidity and hot air within the duct work.

Further objects and advantages of the present invention will be apparent from the following description, reference being had to the accompanying drawings wherein a preferred embodiment of the present invention is clearly shown.

In the drawings:

FIG. 2 is a fragmentary elevational top view of the heating and air conditioning system;

FIG. 3 is a vertical front view of the heating and air conditioning system taken along line 3—3 of FIG. 2 and looking in the direction of the arrows;

FIG. 4 is a vertical end view of the system taken along line 4—4 of FIG. 3 and looking the direction of the arrows;

FIG. 5 is a fragmentary sectional view of the purge outlet taken along section line 5—5 of FIG. 3 and looking in the direction of the arrows;

FIG. 10 is a schematic illustration of the control vacuum valve shown in FIG. 9 at different settings of the dash control assembly;

FIG. 11 is a schematic illustration of the power servo vacuum valve shown in FIG. 6 at various positions to effect system operation;

FIG. 12 is a diagrammatic illustration of the system showing the vacuum and electrical connections for effecting operation of the purge door shown in FIG. 4;

The system herein disclosed utilizes vacuum motors to actuate certain components. Such motors are described in the U.S. Pat. No. 2,963,954, granted Dec. 13, 1960, in the name of A. D. Baker and in U.S. Pat. No. 3,187,640, granted June 8, 1965, in the name of K. W. Young et al. A servo-valve vacuum controlled air-mix damper is described in the U.S. Pat. application, Ser. No. 236,559, filed Nov. 9, 1962, in the name of G. L. Rogers and now abandoned. Suitable amplifier circuits which are condition responsive and taken by themselves are shown to be old in the U.S. Pat. to B. H. Pinckaers, No. 2,945,133, granted July 12, 1960, and also in the U.S. Pat. to J. W. Gray, No. 2,622,231, granted Dec. 16, 1952. Transducers for receiving a signal in the form of a varying electrical current and effecting a corresponding movement in a control unit such as a valve are known and a specific version thereof as described in the U.S. Pat. No. 3,172,021, in the name of M. J. Manahan, and also in U.S. Pat. No. 3,073,345, granted Jan. 15, 1963, in the name of N. R. Hagler. A suction throttling valve is disclosed in the U.S. Pat. No. 3,084,521, granted Apr. 9, 1963, in the name of E. S. Schlotterbeck. A thermal vacuum valve is described in U.S. Pat. No. 1,871,733, granted Aug. 16, 1932, in the name of E. G. Petersen. Components or separate devices such as the above are utilized in the system herein disclosed but they are not herein fully described as their specific forms may be varied and are not necessary in setting forth the present invention.

Figure 1:
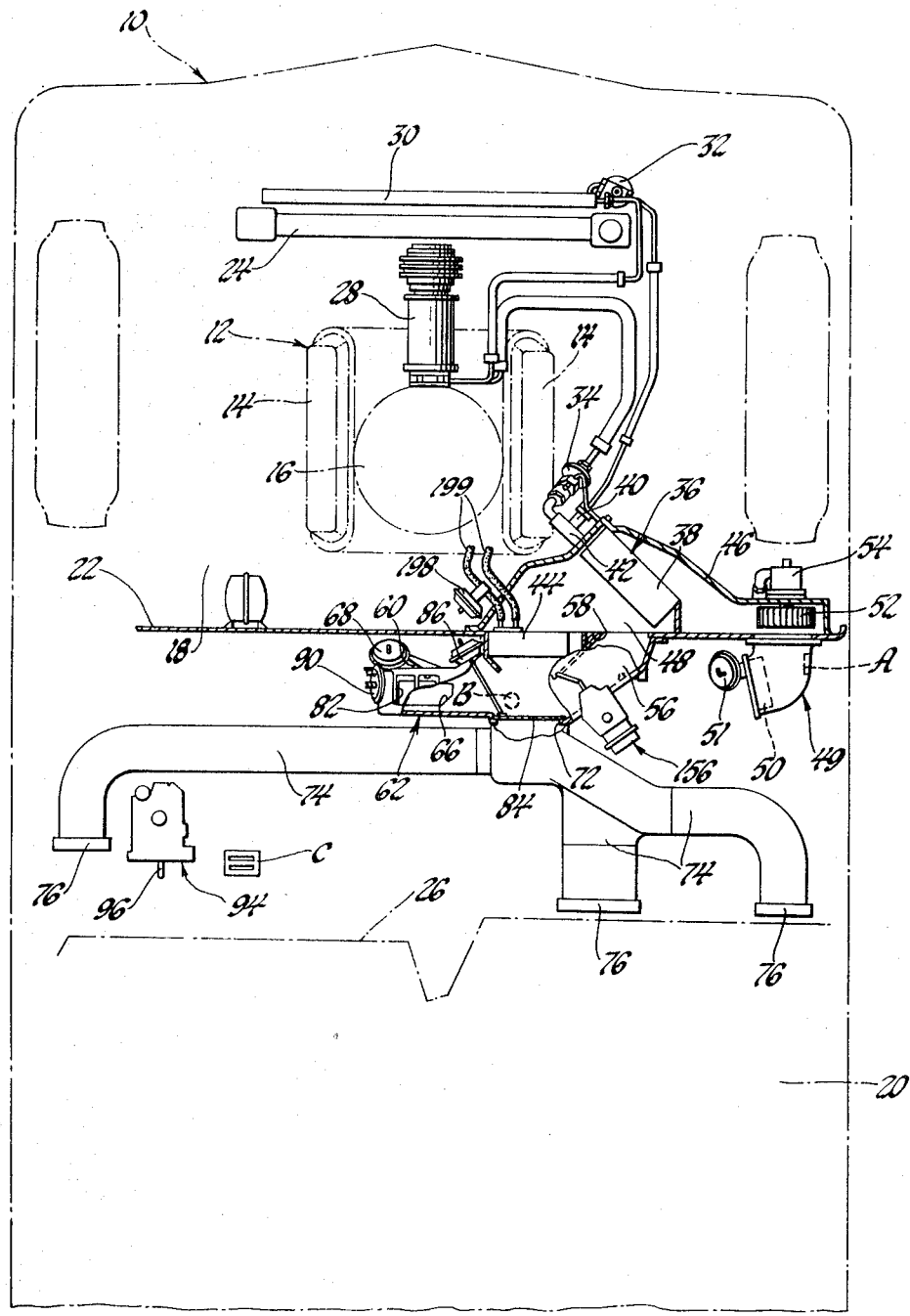
FIG. 1 is an elevational view of the front portion of an automobile broken away and sectioned to reveal the heating and air conditioning system of the present invention.

In FIG. 1, an automobile 10 is illustrated in outline including an engine 12 having valve covers 14 and an air cleaner 16. The engine 12 is mounted within engine compartment 18 which is separated from a passenger compartment 20 by firewall 22. A radiator 24 for cooling engine 12 is mounted within the front end of engine compartment 18. An instrument panel or dash is shown in dot-dash lines at 26 within the passenger compartment 20. Air conditioning components are shown within engine compartment 18 which include a compressor 28, a condenser 30, a dehydrater-receiver 32, a suction throttling valve 34 and an evaporator assembly 36. The evaporator assembly includes a core 38 and an expansion valve 40 (partially hidden by evaporator outlet 42 in FIG. 1). These air conditioning components are well known in the art and specific details of their structure form no part of the present invention. Therefore, a detailed explanation of their construction is unnecessary.

A heater core 44 is shown adjacent firewall 22. Air flowing through core 44 is warmed by transfer of heat from the engine coolant. The heater core 44 and the evaporator core 38 are enclosed within a duct work 46 which forms an elongated plenum chamber 48. An air inlet to the plenum is generally indicated by the numeral 49. Air inlet 49 includes an opening into the passenger compartment 20 for receiving recirculated air and an opening to the outside. A pivotal inlet door 50 is normally positioned to admit about 20 per cent outside air and about 80 per cent recirculated air. A vacuum actuator 51 moves the door 50 against the outside outlet to admit 100 per cent recirculated air when actuated. Adjacent the inlet 49 and forward of firewall 22 is a blower fan 52 which is rotated by blower motor 54. Fan 52 draws air through the inlet 50 and into the plenum 48 where it flows through evaporator core 38. After the air passes through the evaporator core 38, it either flows through heater core 44 or through a bypass duct 56. A pivotal air-mix damper 58 located within the air stream from evaporator core 44 proportions the flow of air through the heater 44 and the bypass 56 in response to heating and cooling requirements of passenger compartment 20 sensed by the system.

After flowing past the air-mix damper 58, air is directed into an air distributor duct 62 for distribution into the passenger compartment 20. When the heating and air conditioning system is inactive, air passes through a purge opening or outlet 60 into the passenger compartment as best illustrated in FIGS. 2, 4 and 5. A purge door 64 is pivotally mounted within duct work 62 to alternately allow air to flow through purge outlet 60 or through a heater outlet 66. The purge door 64 (seen in FIGS. 4 and 5) is spring biased against outlet 66 to normally direct air through purge outlet 60. A vacuum actuator 68 which is operably connected to purge door 64 moves the door to a position blocking purge outlet 60 and unblocking outlet 66 when vacuum pressure is routed to the actuator 68.

The air distributor duct 62 shown in FIGS. 1 – 5 has, in addition to heater outlet 66, an air conditioning outlet 72 for the distribution of cool air through upper level ducts 74 and upper level outlets 76. A defrost outlet 82 directs warm air through flexible tubing (not shown) to the base of the automobile windshield for defrosting purposes. Air is alternately directed either through the upper level outlets 76 or the lower heater outlet 66 and defrost outlet 82 by a pivotal mode door 84. Mode door 84 is normally held by a spring in a position blocking air flow into the upper level air conditioning duct 74 to direct air through the heater outlet 66. A vacuum actuator 86 is operably connected to mode door 84 to move the door into a position blocking heater outlet 66 and defrost outlet 82 for unblocking the air conditioning outlet 72 when vacuum pressure is routed to the actuator 86.

A defroster door 88 is pivotally mounted adjacent the defroster outlet 82 to direct heated air therethrough to the base of the automobile windshield. The defroster door 88 is normally held in the closed position shown in FIG. 3 by a spring (not shown). During the heating mode of operation, a part-travel port 89 of a dual position vacuum actuator 90 is supplied vacuum pressure to move the defroster door 88 into position 88' shown in broken lines in FIG. 3 thus permitting a small quantity of warmed air to flow through outlet 82 onto the windshield. During de-icing and defogging modes of operation vacuum pressure is applied to a full travel port 91 of the vacuum actuator 90 which moves the defroster door 88 to position 88" so as to direct a large quantity of the warmed air through outlet 82 and onto the windshield.

When the heating and air conditioning system is inoperative, fan 52 pumps air through plenum chamber 48. The purge door 64 is normally biased into a position blocking heater outlet 66 which permits air to flow through the purge outlet 60 into the passenger compartment. At the same time, the mode door 84 of the air distributor 62 is held by a spring in position blocking the air conditioning outlet 72 and defroster door 88 is held by a spring in position blocking the defroster outlet 82 as shown in FIGS. 2 and 3 respectively.

When the heating and air conditioning system is in the maximum heating mode of operation, the air-mix damper 58 is positioned to block off bypass 56 which causes all the air flow through heater core 44. During this heating mode of operation, vacuum pressure is supplied to the purge door vacuum actuator 68 to pivot the purge door 64 into a position which blocks the purge outlet 60 and opens the heater outlet 66. During this heating mode of operation, no vacuum pressure is supplied to vacuum actuator 86 and, therefore, mode door 84 is in its normal position blocking the air conditioning outlet 72. During this heating mode of operation, vacuum pressure is applied to port 89 of actuator 90 to move the defroster door 88 to a part-travel position 88' shown in FIG. 3.

When the heating and air conditioning system is in the defogging or de-icing mode of operation, the air-mix damper 58 and the purge door 64 are positioned as set forth above for heating. The mode door 84 is maintained by a spring in a position blocking the air conditioning outlet 72. Vacuum pressure is applied to the port 91 of the dual position vacuum actuator 90 to move the defroster door 88 to its fully opened position 88" which directs substantially all the air through the defroster outlet 82 and onto the windshield.

When the heating and air conditioning system is in the maximum air conditioning mode of operation, the air-mix damper 58 is positioned to unblock air flow through bypass 56 and to effectively block air flow through heater core 44. Simultaneously, the purge door 64 is moved by actuator 68 to a position which blocks purge outlet 60 and unblocks heater outlet 66. Also, vacuum actuator 86 moves the mode door 84 into a position which directs air through the air conditioning outlet 72.

Figure 7:
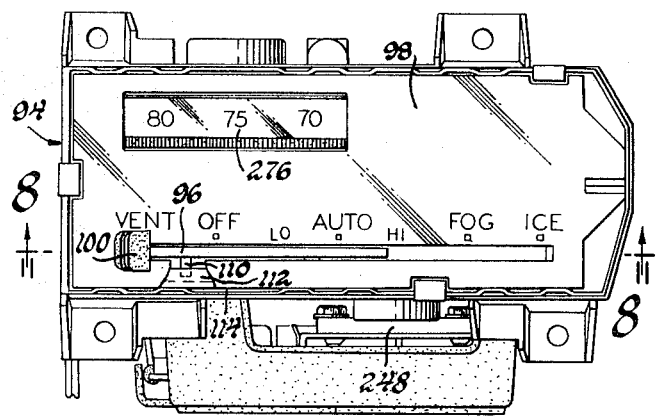
FIG. 7 is a vertical view of a dash control assembly as would be seen from the passenger compartment revealing controls for operating the system.
Figure 8:
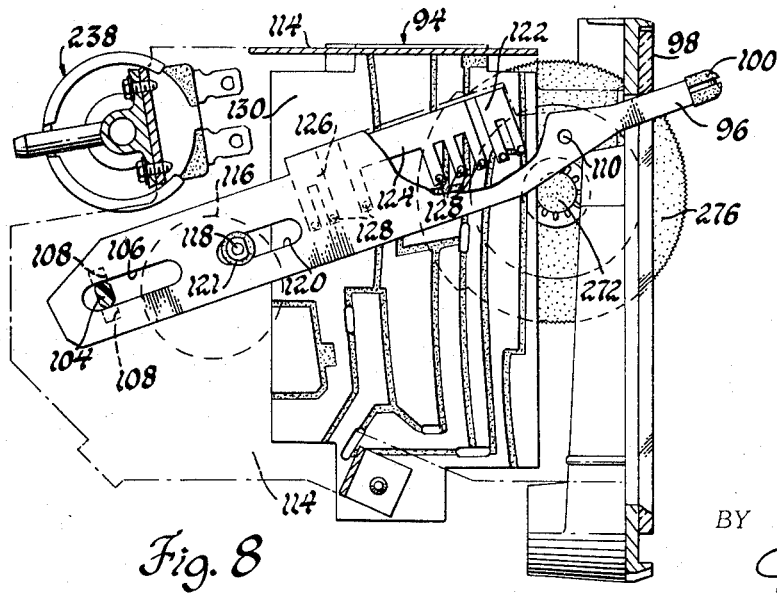
FIG. 8 is a horizontal sectioned view of the dash control assembly taken along section line 8—8 in FIG. 7.
Figure 9:
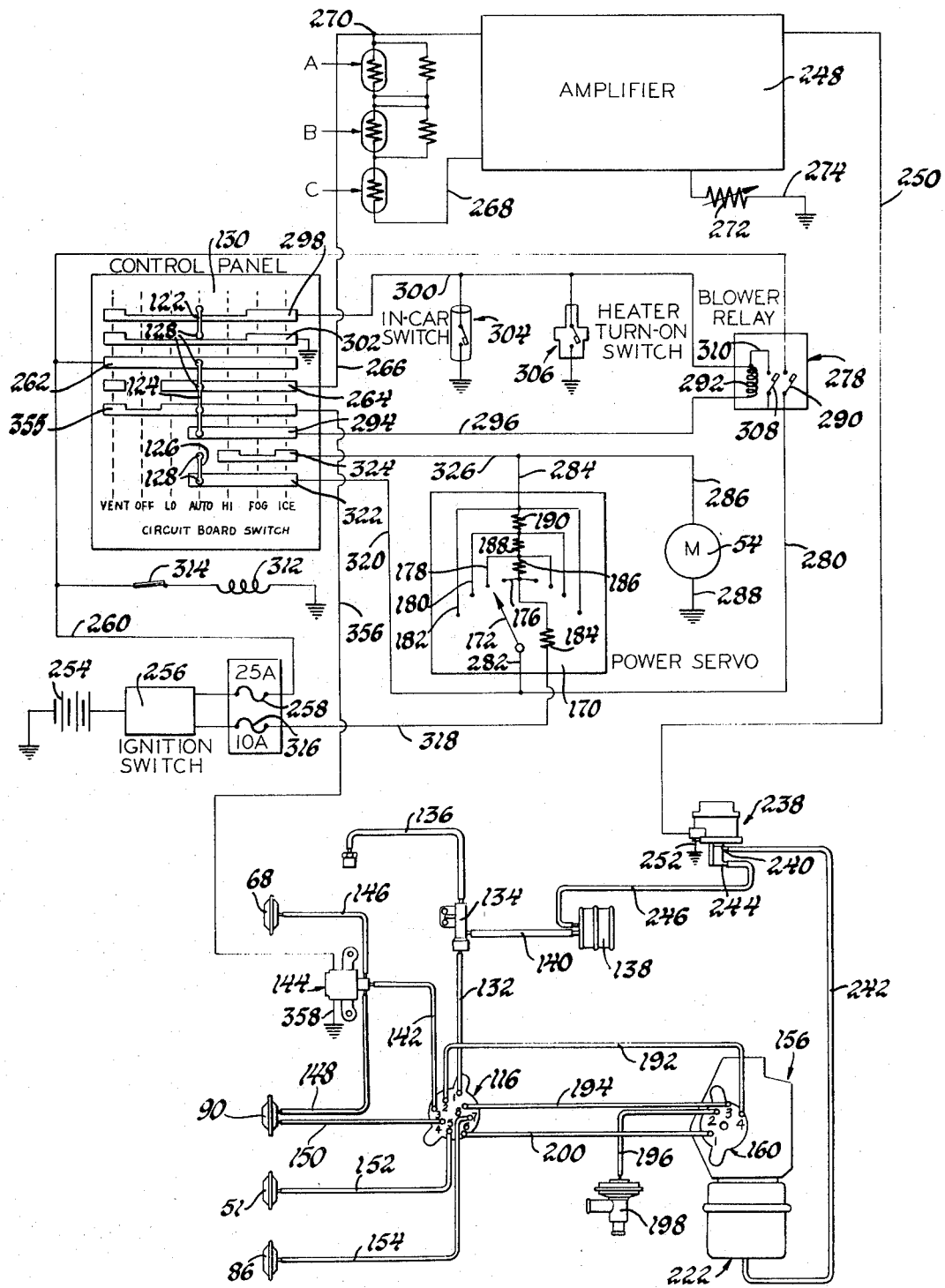
FIG. 9 is a diagrammatic view showing vacuum components and electrical components of the system which cooperate together to maintain desired heating and cooling.

The aforementioned energization of the vacuum actuators and resultant positioning of dampers and doors is controlled by a vacuum-electrical climate control system schematically shown in FIG. 9. In addition, this system regulates the speed of blower motor 54. A dash mounted control head assembly 94 shown in FIG. 1 includes a lever 96 which is manually set by the vehicle operator at one of the seven positions illustrated in FIG. 7 which is a view of the control head assembly 94 as seen by the automobile operator. More particularly, the control head assembly 94 includes a labeled front face 98 which identifies the seven positions of the control system. A knob 100 on the end of lever 96 may be moved by the operator to the following operating positions: vent, off, low, auto, high, fog and ice. Lever 96 extends through the face 98 and is pivoted about a pivot post 104 as best seen in FIG. 8. Post 104 extends through an elongated slot 106 in lever 96 and integral tabs 108 on the end of post 104 overlay the lever 96. Lever 96 pivots about post 104 in a path defined by the coaction of a pin 110 on lever 96 and a track 112 secured to a base plate 114 of the control head assembly 94.

As lever 96 is pivoted about post 104 from the vent position to the ice position, a portion of a control head vacuum valve 116 is rotated approximately 90 with respect to a portion of the valve affixed to base plate 114. An upstanding pin 118 on the movable portion projects through and is engaged by an elongated slot 120 in the lever 96 to rotate the valve. A nylon insert 121 encircles the pin 118 and reduces friction between the pin and the sides of slot 120 as lever 96 is pivoted.

Lever 96 supports three insulated conductors 122, 124, and 126 each having a plurality of cantilevered contacts which move with the lever 96 and bear against a circuit board 130. The coaction between conductors 122, 124, and 126 and the circuit board 130 is best understood by reference to FIG. 9. In FIG. 9, the circuit board 130 schematically shows the seven positions of control head assembly 94. Conductors 122, 124, and 126 are shown in the auto position it being understood that as lever 96 is pivoted the conductors 122, 124, and 126 move to the positions corresponding to the dotted lines on the circuit board 130. The enlarged rounded portions 128 of conductors 122, 124, and 126 represent the aforementioned contacts which touch the circuit board 130.

The control head vacuum valve 116 shown in FIG. 8 is illustrated schematically in FIG. 9. Valve 116 has eight ports and a vent passage which are alternately interconnected as lever 96 is pivoted through the seven operative positions of the control head assembly 94. Port 1 of vacuum valve 116 is connected by vacuum line 132 to an inlet of a check valve 134. The outlet of check valve 134 is connected by a vacuum line 136 to a raw vacuum source such as the intake manifold of an internal combustion engine. The purpose of check valve 134 is to prevent air flow from the vacuum source to valve 116 upon failure of the vacuum source to maintain a predetermined vacuum pressure. A vacuum storage tank 138 is also connected to the inlet of check valve 134 by vacuum line 140. Port 3 of valve 116 is connected by a vacuum line 142 to the outlet of a normally closed electrically actuated valve 144. The purge door vacuum actuator 68 is connected to an inlet of valve 144 by a vacuum line 146. The port 89 of the defroster vacuum actuator 90 is connected to an inlet of valve 144 by a vacuum line 148. Port 4 of valve 116 is connected by a vacuum line 150 to port 91 of the defroster vacuum actuator 90. Port 5 of valve 116 is connected by a vacuum line 152 to the recirculating air vacuum actuator 51. Port 7 of valve 116 is connected by a vacuum line 154 to the mode door vacuum actuator 86.

Figure 6:
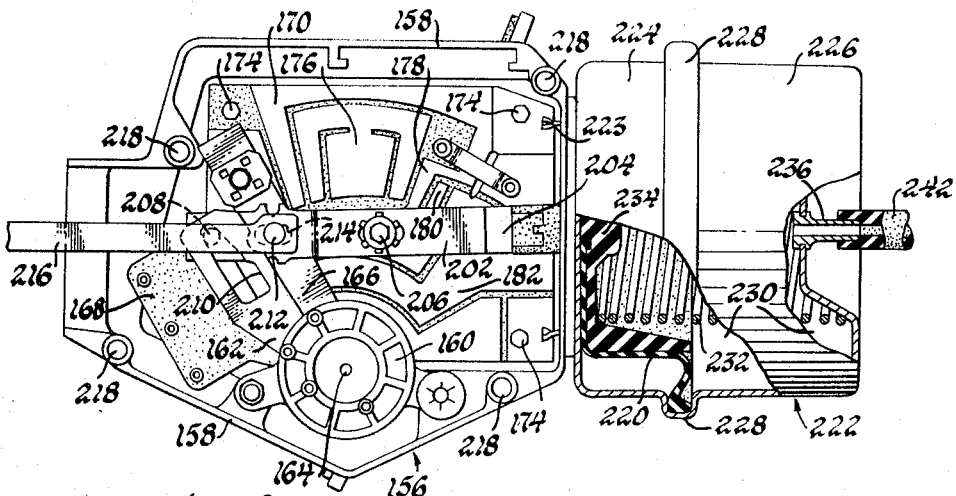
FIG. 6 is an enlarged elevational view of the power servo assembly shown in FIG. 1 with its top cover removed.

The air-mix damper 58 is positioned by a servo-power assembly 156 shown in FIGS. 1, 6 and 9 to proportion a flow of air through heater core 44 and through bypass 56. The servo-power assembly 156 has a thin walled housing 158 which supports a servo vacuum valve 160. Vacuum valve 160 is a rotary valve similar to the control head vacuum valve 116 and has a movable portion with four ports and a vent passage. The moveable portion of valve 160 is rotated by a lever 162 about an axis 164. A second lever 166 is supported by housing 158 and is pivoted about axis 164. Lever 166 supports insulated conductor plate 168. Conductor plate 168 supports interconnected conductor arms (not visible in FIG. 6) on its bottom surface which are shown schematically as 172 in FIG. 9. A circuit board 170 which is secured to housing 158 by a plurality of screws 174, has insulated conductor strips 176, 178, 180 and 182 on its surface. The conductor arms 172 pivot about the axis 164 and slide along conductor strips 176, 178, 180 and 182. Four resistors 184, 186, 188 and 190 are connected respectively to conductor strips 176, 178, 180 and 182 to complete the switch arrangement schematically shown in FIG. 12. As conductor arms 172 pivot about axis 164 from one side of housing 158 to the other, a circuit is completed successively through conductor strip 182, through conductor strip 180, through conductor strip 178, through conductor strip 176, again through conductor strip 178, through conductor strip 180, and through conductor strip 182.

The vacuum valve 160 is rotated by lever 162 which interconnect its ports and its vent passage in response to the angular position of the lever. As shown in FIG. 9, port 4 of the vacuum valve 160 is connected by vacuum line 192 to port 2 of the control head vacuum valve 116. Port 3 of valve 160 is connected by vacuum line 194 to port 8 of the control head vacuum valve 116. Port 2 of the vacuum valve 160 is connected by vacuum line 196 to a water control valve 198 which is opened by vacuum pressure to permit passage of engine coolant into heater core 44. Water control valve 198 is located adjacent firewall 22 is FIG. 1 and regulates the coolant flow through one of two heater hoses 199 (partially illustrated). Port 1 of the servo vacuum valve 160 is connected by vacuum line 200 to port 6 of the control head vacuum valve 116.

Referring again to FIG. 6, levers 162 and 166 are pivoted about axis 164 by the linear movement of interconnected and superimposed arms 202 and 204 within housing 158. Arms 202 and 204 are joined for movement together by a nut and bolt fastening means 206. An upstanding pin 208 on the upper arm 202 engages an elongated slot 210 in lever 162 to pivot the lever and rotate a portion of valve 160 about axis 164. A second pin 212 on the lower arm 204 engages the lever 166 to rotate the lever and the attached conductor plate 168 about axis 164. An actuating arm 216 is engaged at one end by the pin 212 and extends through an opening in housing 158. Arm 216 is connected at another end to a crank arm of the air-mix damper 58 to pivot the damper into variable positions. A dust cover (not shown) is attached at locations 218 by bolts to enclose the aforementioned components in housing 158. Ports 1 through 4 of valve 160 project through holes in the dust cover for exterior connection to vacuum lines.

The members 162, 166, 202, 204 and 216 are moved in housing 158 by a diaphragm 220 positioned in the interior of a power housing 222 which is attached to one end of housing 158 by twisted tabs 223. Housing 222 is formed by joining the edges of cup-shaped members 224 and 226 in the manner shown at 228. The outer peripheral edge of diaphragm 220 is held between the edges of members 224 and 226 at joint 228. Arm 204 projects through housing 158 and into the interior of housing 222 where it is attached to diaphragm 220. The diaphragm 222 extends across the interior housing 222 and forms a variable volume chamber 230 between it and member 226. A spring 232 in chamber 230 normally presses the diaphragm against the end of member 224. A cup-shaped stiffening washer 234 is attached to the central region of diaphragm 220 and contacts spring 232. A vacuum outlet fitting 236 on member 226 extends into chamber 230.

When vacuum pressure is applied to the chamber 230 through outlet 236, diaphragm 220 and washer 234 move to the right against the force of spring 232 to linearly move arms 202, 204, and 216. This movement of the arms produces rotational movement of levers 162 and 166 and rotates the air-mix damper 58. The extent of the movement of diaphragm 220 against spring 232 is dependent upon the vacuum pressure strength applied to chamber 230. As will be revealed by later description, a weak vacuum pressure applied to chamber 230 corresponds to the maximum air conditioning mode of operation of the system. A relatively strong vacuum pressure applied to chamber 230 moves lever 162, lever 166 and arm 216 to the right to effect the position of the system components for the maximum heating mode of operation. Intermediate vacuum pressures applied to chamber 230 correspond to intermediate positions of air-mix damper 58 to produce warmer or cooler air flow.

An electrically controlled vacuum transducer 238 (see FIGS. 8 and 9) has an inlet port 240 connected by a vacuum line 242 to the outlet 236 of the power housing 222. An outlet 244 of transducer 238 is connected by a vacuum line 246 to the vacuum storage tank 138. Vacuum pressure from the intake manifold of an internal combustion engine is transmitted through vacuum line 136, check valve 134, vacuum line 140, storage tank 138, and vacuum line 246 to the vacuum transducer 238. The transducer 238 mixes air at atmospheric pressure with the vacuum pressure from the storage tank to create a decreased regulated vacuum pressure in line 242 and chamber 230 in response to a voltage signal input to the transducer. Reference is had to the U.S. Pat. No. 3,073,345, granted Jan. 15, 1963, in the name of N. R. Hagler, for a more detailed explanation of the structure and operation of the vacuum transducer 238.

The vacuum transducer 238 receives a variable voltage signal from an amplifier 248 through a conductor 250. Another lead 252 grounds the transducer 238. The amplifier 248 is supported on the underside of the control head assembly 94 as shown in FIG. 7. Input power for amplifier 248 is supplied from an automobile battery 254 through the ignition switch 256, a fuse 258, a conductor 260, to a conductor strip 262 on circuit board 130. Hence the circuit extends from conductor strip 262 through conductor 124 to another conductor strip 264 on circuit board 130 and from there through a conductor 266 to the amplifier 248.

Note that the conductor strips 262 and 264 are unconnected by conductor 124 when the lever 96 of control head assembly 92 is placed in the off position. Conductor 266 is the primary power input for amplifier 248. A secondary power input 268 to the amplifier 248 extends between conductor 266 at terminal 270 and the amplifier. Three thermistors A, B and C in series in conductor 268 sense various temperature conditions in and about the automobile and change resistance in inverse proportion to temperature variation. The resistance of the three thermistors in series influences the amplifier 248 to send a variable voltage signal through conductor 250 to the vacuum transducer 238.

Thermistor A is an ambient temperature sensor positioned adjacent the air inlet 49 as shown in FIG. 1. Thermistor B is an air outlet temperature sensor positioned downstream from the air-mix damper 58. Thermistor C is an in-car temperature sensor located on the dash where is senses the sum load on the automobile.

The net resistance of thermistors A, B and C is further varied to alter the input to amplifier 248 by a manually adjustable rheostat 272. Rheostat 272 is electrically connected to amplifier 248 and is grounded by a conductor 274. The rheostat is part of the control head assembly 94 as is shown in FIGS. 7 and 8 and is manually adjustable by rotation of a calibrated dial 276 which projects through face 98 of the assembly 94. The net resistance of thermistors A, B, C and the rheostat 272 effects a regulated voltage output from amplifier 248 which is applied to transducer 238 by conductor 250. The regulated voltage signal controls the vacuum pressure produced by the transducer 238. This controlled vacuum pressure is supplied to the servo-power assembly 156 through vacuum line 242 to position its servo vacuum valve 160 and its conductor arm 172 in accordance with desired heating and cooling.

The internal connections of the vacuum ports and vent passages of the control head vacuum valve 116 and of the servo vacuum valve 160 are shown in FIGS. 10 and 11 respectively. FIG. 10 shows the five alternate conditions of the valve 116, corresponding to the positions of lever 96. FIG. 11 shows the four alternate positions of the valve 160 as lever 162 is pivoted from a maximum air conditioning position (counterclockwise to the left in FIG. 6) to a maximum heating position (clockwise to the right in FIG. 9).

Figure 14:
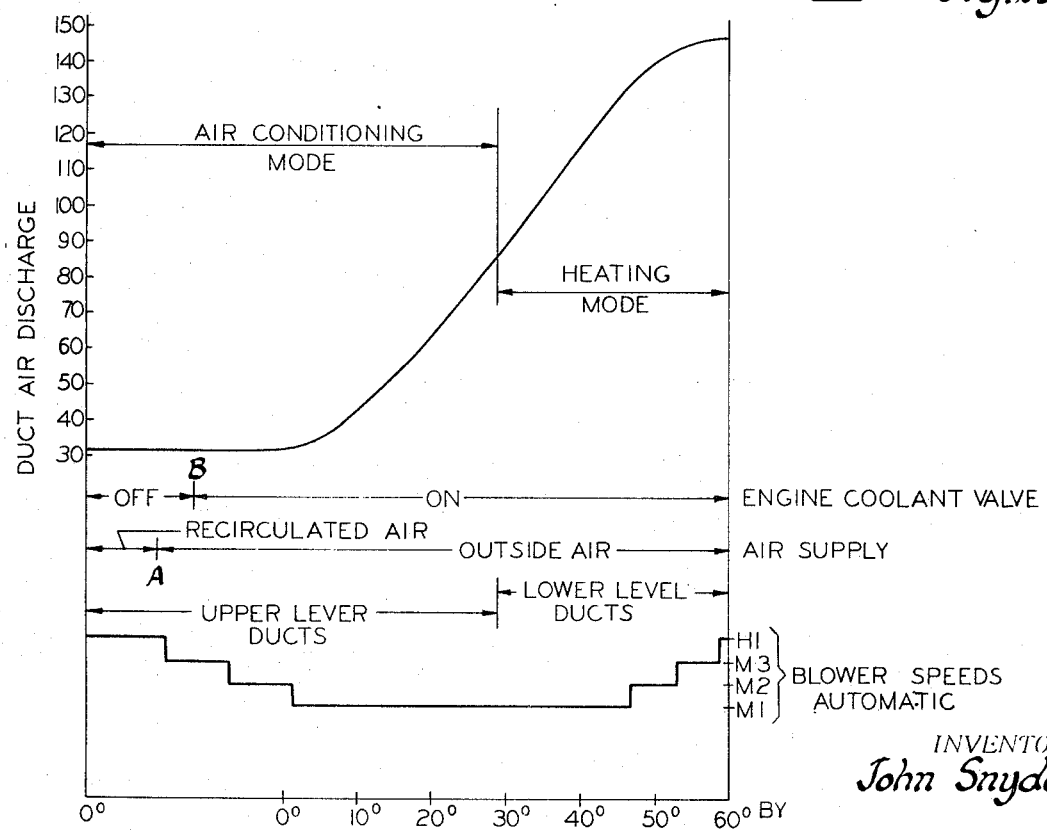
FIG. 14 presents a diagram showing the duct outlet temperature and blower speed program as a function of the air-mix damper position.

The graph in FIG. 14 reveals the various control functions of the system plotted in relationship to the angular position of air-mix damper 58. The left hand ordinate of FIG. 14 corresponds to the position of damper 58 in the maximum air conditioning mode of operation. The right hand ordinate of FIG. 14 corresponds to the position of damper 58 when it is pivoted to the maximum heating mode of operation. Note that the air-mix damper 58 is held in the zero degree maximum air conditioning position for a portion of the extreme leftward movement of arm 216 as shown by the labeling of the abscissa in FIG. 14. This delay of damper movement is caused by a sprung, relatively movable linkage (not shown) between the arm 216 and the crank arm of the damper 58. For further details of a similar arrangement reference is made to U.S. Pat. No. 3,263,739 to Gaskill, et al issued Aug. 2, 1966.

As levers 162 and 166 in assembly 156 are pivoted from the maximum air conditioning position to the maximum heating position, conductor arms 172 of assembly 156 are drawn across circuit board 170 as is schematically illustrated in FIGS. 9 and 14. The connection of conductor arms 172 alternately with the conductor strips 176, 178, 180 and 182 regulates the speed of the blower motor 54. More particularly, the primary blower motor circuit extends from battery 254 through ignition switch 256, fuse 258, conductor 260, a blower motor relay generally indicated at 278, a conductor 280, a conductor 282, conductor arms 172, circuit board 170, conductors 284 and 286 to motor 54 and hence to ground through a conductor 288. The blower motor relay 278 includes a normally open switch 290 in the conductor 280. Switch 290 is closed by energization of a solenoid 292 whose leads are connected to a conductor strip 294 of circuit board 130 by a conductor 296 and to a conductor strip 298 of circuit board 130 by a conductor 300. Power is supplied to solenoid 292 by a circuit from battery 254 through ignition switch 256, fuse 258, conductor 260, conductor strip 262, conductors 124, conductor strip 294, conductor 296, solenoid 294, conductor 300 to the conductor strip 298. When lever 96 of the control head assembly 94 is placed at the fog or ice positions a circuit is completed by conductors 122 to a conductor strip 302 on the circuit board 130 which is grounded. When lever 96 is placed on the vent, off or low positions of the control head assembly 94, conductors 124 do not contact the conductor strip 294 and therefore no power is applied to solenoid 292. Further when the lever 96 is placed on the auto or high position, the conductors 122 do not interconnect the conductor strips 298 and 302 to complete the circuit through the solenoid 292. However, the solenoid 292 may be energized when the control lever 96 is placed in the auto or high positions by auxiliary grounding of conductor 300 through an in-car switch 304 or a heater turn-on switch 306. The in-car switch 304 which is connected between conductor 300 and ground immediately energizes the blower motor for air conditioning operation whenever temperature of the passenger compartment exceeds a predetermined relatively high level. The heater turn-on switch 306 which is connected between conductor 300 and the ground delays energization of the blower motor during a heating mode of operation until the temperature of engine coolant rises to a predetermined warm level. It should be noted that a second switch 308 in the blower motor relay 278 is closed by energization of solenoid 292. After switch 308 is closed by the solenoid 292, a current path is provided through the solenoid, conductor 310 and switch 308 to ground independently of conductor 122 and switches 304, 306. This locking feature in relay 278 prevents deenergization of the blower motor 54 by either switches 304 or 306.

While the automobile is operated in an ambient exceeding a predetermined temperature, the air conditioning compressor 28 is continually operated to dehumidify air within the plenum chamber 48. In FIG. 9, a magnetically actuated clutch pulley for the compressor 28 is schematically illustrated at 312. A bimetal ambient sensing switch 314 controls energization of clutch 312 by completing a circuit from battery 254 through ignition switch 256, fuse 258, conductor 260, bimetal switch 314, clutch 312 to ground. To complement this continual compressor operation and consequential dehumidifying, blower motor 54 is continually run at its lowest speed while ignition switch 256 is closed. More particularly, a closed circuit extends from battery 254 through ignition switch 256, a fuse 316, a conductor 318, the resistors of the circuit board 170 in series, conductors 284 and 286, motor 54 to ground. As previously explained, the blower motor circuit is altered by movement of conductor arms 172 over circuit board 170 to produce increased blower motor speed.

When lever 96 of the control head assembly 94 is placed in the high and ice positions, a closed circuit bypasses the circuit board 170 of the servo-power assembly 156 to effect a high blower speed. This circuit extends from battery 254, through ignition switch 256, fuse 258, conductor 260, switch 290 of blower relay 278, conductor 280, a conductor 320, a conductor strip 322 on circuit board 130, conductors 126 supported by lever 96, a conductor strip 324, a conductor 326 and conductor 286 to the blower motor 54 and hence through conductor 288 to ground.

Pivotal movement of purge door 64 to close purge outlet 60 and open heater outlet 66 is effected by vacuum actuator 68 in response to settings of the lever 96. As previously explained, it is desirable to open the purge outlet 60 to the passenger compartment when the heating and air conditioning system is inoperative. Conversely, it is desirable to open heater outlet 66 when the system is operative. FIG. 12 isolates the electrical and vacuum controls which position the purge door 64. Vacuum pressure is routed to port 1 of the control head vacuum valve 116 by a vacuum line 132. As can be seen in FIG. 10, port 1 and port 3 of valve 116 are innerconnected in all positions of lever 96. A vacuum line 142 extends from port 3 to the outlet of valve 144. Another vacuum line 146 extends from the vacuum actuator 68 to an inlet of valve 144. When valve 144 is open vacuum pressure is applied to actuator 68 through the valve.

Figure 13:
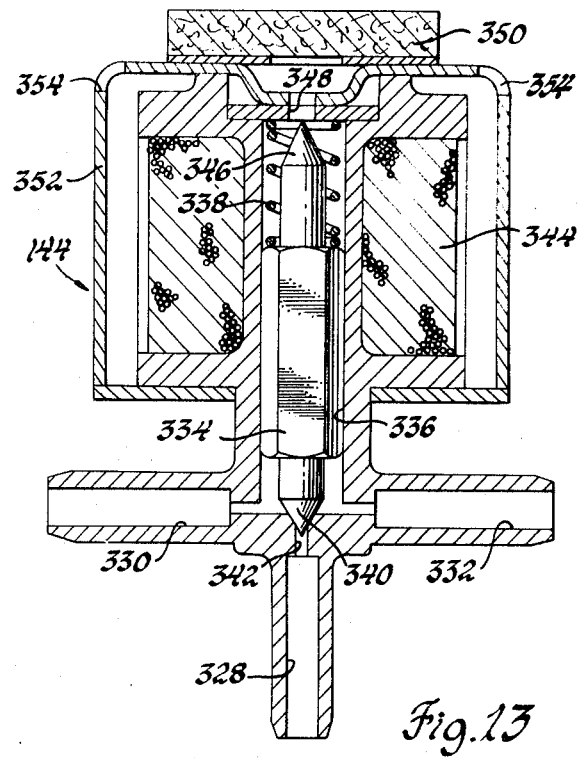
FIG. 13 is a sectional view of the electrically actuated vacuum valve shown in FIG. 12.

As shown in FIG. 13, valve 144 is a normally closed, electrically controlled valve having an outlet 328 and two inlets 330 and 332. Outlet 328 is connected to vacuum line 142 for supplying vacuum pressure to the valve 144. Inlet 330 and 332 are connected to vacuum lines 146 and 148 respectively for supplying vacuum pressure to actuators 90 and 68. A reciprocal valve element 334 within a bore 336 is normally biased downward by a spring 338 to cause an end 340 of valve element 334 to block outlet passage 342. An electrical solenoid coil 344 surrounds the valve element 334 and causes it to move upward against the force of spring 338 when electrical energy is applied to the coil. Upward movement of valve element 334 causes an end 346 of the valve element 334 to block a vent passage 348. Normally vent passage 348 communicates inlets 330 and 332 with atmosphere by leakage between the noncircular valve element 334 and bore 336. A filter 350 prevents dust from entering vent passage 348. An outer casing 352 which protects the solenoid coil 344 has vents 354 therethrough for cooling the coil. Accordingly, it can be seen that when coil 344 is unenergized, end 344 of valve element 334 blocks the outlet passage 342 and inlets 330 and 332 are in communication with atmospheric pressure through vent 348. When coil 344 is energized, vent passage 348 is blocked by end 346 of valve element 334 and the outlet passage 342 is unblocked so inlets 330 and 332 are supplied with vacuum pressure from outlet 328.

From FIG. 12, it is clear that when lever 96 of the control head assembly 94 is placed in vent, low, auto, high, fog or ice positions, an electrical circuit extends from conductor 260 (which is the power input line shown in FIG. 9) through conductor strip 262, conductors 124, a conductor strip 354, a conductor 356, to the valve 144 which is grounded by a conductor 358. Thus coil 344 of valve 144 is energized in all of the positions of lever 96 except the off position. Consequently, purge door 64 blocks heater outlet 66 and unblocks purge outlet 60 when lever 96 is in the off position or when the ignition switch 256 is open. At the other positions of lever 96, the purge door 64 unblocks heater outlet 66 and blocks purge outlet 60 in response to vacuum applied to the actuator 68. This operation of purge door 64 in combination with the aforementioned continual blower motor operation provides a desirable air flow through the plenum chamber 48 while the system is inoperative.

While the embodiment of the present invention as herein described constitutes a preferred form, it is to be understood that other forms may be adapted.

What is claimed is as follows:

1. A heating and air conditioning system for an automobile passenger compartment comprising: hollow duct means forming an elongated plenum chamber for passing air therethrough; a warmed heater core within said plenum chamber for heating air flowing through said plenum chamber; a cooled evaporator core within said plenum chamber for cooling and dehumidifying air flowing through said plenum chamber; an inlet opening in said duct means for admitting air from said passenger compartment into one end of said elongated plenum chamber; outlet opening means in said duct for discharging air from the other end of said elongated plenum chamber into said passenger compartment; a blower within said plenum chamber for drawing air through said inlet from said passenger compartment and discharging the air through said outlet means back into said passenger compartment; an electric motor powered by a battery for rotating said blower; and means including the automobile ignition switch for energizing said blower motor for producing a continuous relatively low volume of airflow through said plenum independently of the heating and air conditioning controls.

2. A heating and air conditioning system for an automobile passenger compartment comprising: hollow duct means forming an elongated plenum chamber for passing air therethrough; a warmed heater core within said plenum chamber for heating air flowing through said plenum chamber; a cooled evaporator core within said plenum chamber for cooling and dehumidifying air flowing through said plenum chamber; an inlet in said duct means for admitting air into one end of said elongated plenum chamber; a purge outlet in said duct means for discharging air from the other end of said elongated plenum chamber into the passenger compartment; another outlet in said duct means for discharging air from said other end of said elongated plenum chamber into the passenger compartment; control means for blocking said last mentioned outlet and unblocking said purge outlet when the heating and air conditioning system is inactive and for unblocking said last mentioned outlet and blocking said purge outlet when the system is active; an electric motor powered fan energized through the automobile ignition switch to cause a continuous air flow into said inlet means, through said plenum chamber and alternatively out said purge outlet and said other outlet into the passenger compartment.

3. The heating and ventilating system as set forth in Claim 2, wherein said duct means extends through a firewall of the automobile to discharge air into the front of the passenger compartment, said purge outlet facing in a direction away from the passenger compartment toward the firewall for preventing a direct flow of air therethrough onto passengers in the passenger compartment.

4. A heating and air conditioning system as set forth in Claim 2, wherein said purge outlet has a smaller flow area than said other outlet.

5. A heating and air conditioning system as set forth in Claim 2, wherein said purge outlet and said other outlet are adjacent one another through said duct means, said control means including a door hinged at one edge to said duct means between said purge outlet and said other outlet and pivotal to alternately block said outlets.

* * * * *